United States Patent
Chen et al.

(10) Patent No.: US 6,212,153 B1
(45) Date of Patent: *Apr. 3, 2001

(54) HIGH NA SOLID CATADIOPTRIC FOCUSING DEVICE HAVING A FLAT KINOFORM PHASE PROFILE

(75) Inventors: Hong Chen, San Jose; Chuan He; Ross W. Stovall, both of Fremont; Charles C. Cheng, Cupertino, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/235,129

(22) Filed: Jan. 21, 1999

Related U.S. Application Data

(60) Provisional application No. 60/091,788, filed on Jul. 6, 1998.

(51) Int. Cl.[7] ........................................................ G11B 7/00
(52) U.S. Cl. ................................. 369/112.12; 369/112.14
(58) Field of Search .................................... 369/112, 103, 369/44.11, 44.14, 44.23; 359/573, 577, 731, 732; 250/216

(56) References Cited

U.S. PATENT DOCUMENTS

| | | | |
|---|---|---|---|
| 4,835,380 | * 5/1989 | Opheij et al. | 250/216 |
| 4,940,890 | * 7/1990 | Opheij et al. | 250/216 |
| 5,029,255 | * 7/1991 | Opheij et al. | 250/216 |
| 5,042,928 | 8/1991 | Richards | 359/728 |
| 5,125,750 | 6/1992 | Corle et al. | 350/819 |
| 5,497,359 | 3/1996 | Mamin et al. | 369/44.15 |
| 5,689,480 | 11/1997 | Kino | 369/14 |
| 5,986,995 | * 11/1999 | He et al. | 369/112 |

OTHER PUBLICATIONS

Lee, C.W., et al., "Feasibility Study on Near Field Optical Memory Using A Catadioptric Optical System", Optical Data Storage, Technical Digest Series, vol. 8, pp. 137–139, May 10–13, 1998.*

Mansipur, M. et al. "Parallel Processing", 42 Optics and Photonics News, pp. 42–45, Jun. 1998.*

* cited by examiner

*Primary Examiner*—Thang V. Tran
(74) *Attorney, Agent, or Firm*—Samuel A. Kassatly; Robert Hayden

(57) ABSTRACT

A magneto-optical head using a catadioptric focusing device comprised of an incident surface, a bottom reflective surface, a pedestal, and a body. The incident surface is generally flat and is comprised of a central diffractive, optically transmissive facet and a peripheral facet comprised of a kinoform phase profile. In a data writing or reading mode, an incident optical beam, such as a laser beam impinges upon the central facet, and is diffracted thereby. The incident laser beam can be collimated, convergent or divergent. The laser beam passes through the transparent body, and impinges upon the bottom reflective surface. The laser beam is then reflected by the bottom reflective surface, through the body, unto the kinoform phase profile. The laser beam is reflected and refracted by the peripheral kinoform phase profile as a focused beam, through the body, and is focused as a focal point. The focal point is preferably located at, or in close proximity to a pedestal edge, along a central axis, in very close proximity to the disk. This will allow the focused optical beam to propagate toward, or penetrate the disk through evanescent wave coupling, for enabling the transduction of data to and from the disk.

24 Claims, 6 Drawing Sheets

HIGH NA SOLID CATADIOPTRIC FOCUSING DEVICE HAVING A FLAT KINOFORM PHASE PROFILE

CROSS-REFERENCE TO RELATED APPLICATIONS

This application claims the priority of the following U.S. provisional patent application Ser. No. 60/091,788, filed on Jul. 6, 1998, titled "High NA Solid Catadioptric Focusing device Having a Flat Kinoform Phase Profile", assigned to the same assignee as the present application, and incorporated herein by reference in its entirety.

BACKGROUND OF THE INVENTION

1. Field of the Invention

The present invention relates in general to optical devices, and it particularly relates to a high numerical aperture (NA) catadioptric focusing device having a flat kinoform phase profile, for use in data storage systems such as optical and magneto-optical (MO) disk drives.

2. Description of Related Art

In a MO storage system, a thin film read/write head includes an optical assembly for directing and focusing an optical beam, such as a laser beam, and an electromagnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is generally inversely proportional to the numerical aperture (NA) of an objective lens forming part of the optical assembly, and proportional to the wavelength of the optical beam. As a result, the objective lens is selected to have a large NA. However, the NA in objective lenses can be 1 if the focusing spot were in air, thus limiting the spot size. Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, June 1998.

While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electromagnetic components are assembled to a slider body, and aligned for optimal performance.

SUMMARY OF THE INVENTION

One aspect of the present invention is to satisfy the long felt, and still unsatisfied need for a near-field optical or MO disk data storage system that uses a catadioptric focusing device or lens with a high numerical aperture (NA), which does not introduce significant spot aberration on the disk.

Another aspect of the present invention is to provide a focusing device that has generally flat surfaces that act as reference surfaces and facilitate its manufacture and its assembly to the head.

The focusing device includes an incident surface, a bottom reflective surface, a focal pedestal, and a body. The incident surface is generally flat and is comprised of a central diffractive, optically transmissive facet or surface and a peripheral facet or surface comprised of a kinoform phase profile. In a data writing or reading mode, the incident optical beam, such as a laser beam impinges upon the central facet, and is diffracted thereby. The incident laser beam can be collimated, convergent or divergent.

The laser beam passes through the transparent body, and impinges upon the bottom reflective surface. The laser beam is then reflected by the bottom reflective surface, through the body, unto the kinoform phase profile. The laser beam is reflected and refracted by the peripheral kinoform phase profile as a focused beam, through the body, and is focused as a focal point. The focal point is preferably located at, or in close proximity to a pedestal edge, along a central axis, in very close proximity to the disk. This will allow the focused optical beam to propagate toward, or penetrate the disk through evanescent wave coupling, for enabling the transduction of data to and from the disk.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar or identical elements. It should be understood that the sizes of the different components in the figures might not be in exact proportion, and are shown for visual clarity and for the purpose of explanation.

DETAILED DESCRIPTION OF THE INVENTION

Figure 1:
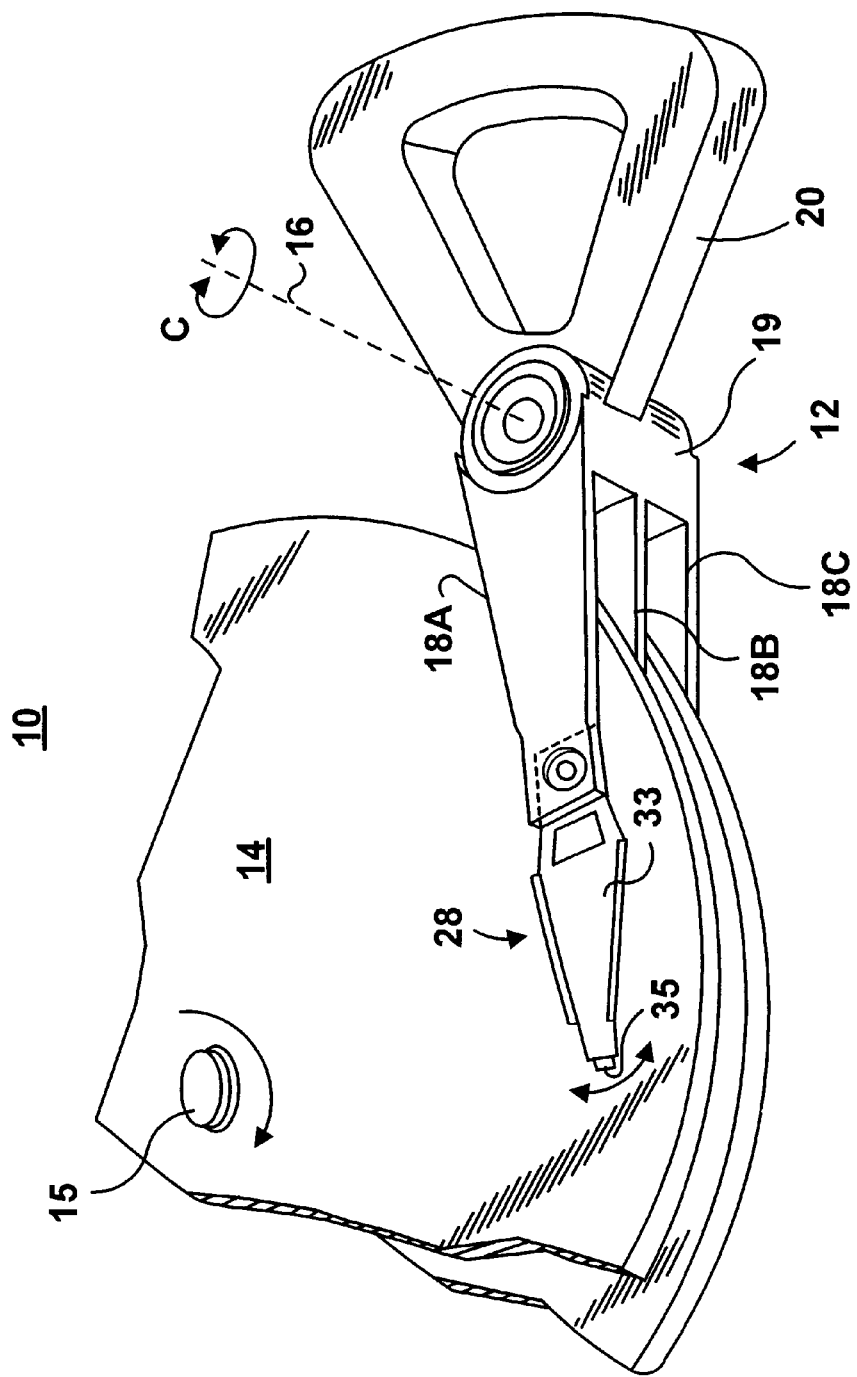
FIG. 1 is a fragmentary perspective view of a data storage system utilizing a read/write head according to the invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
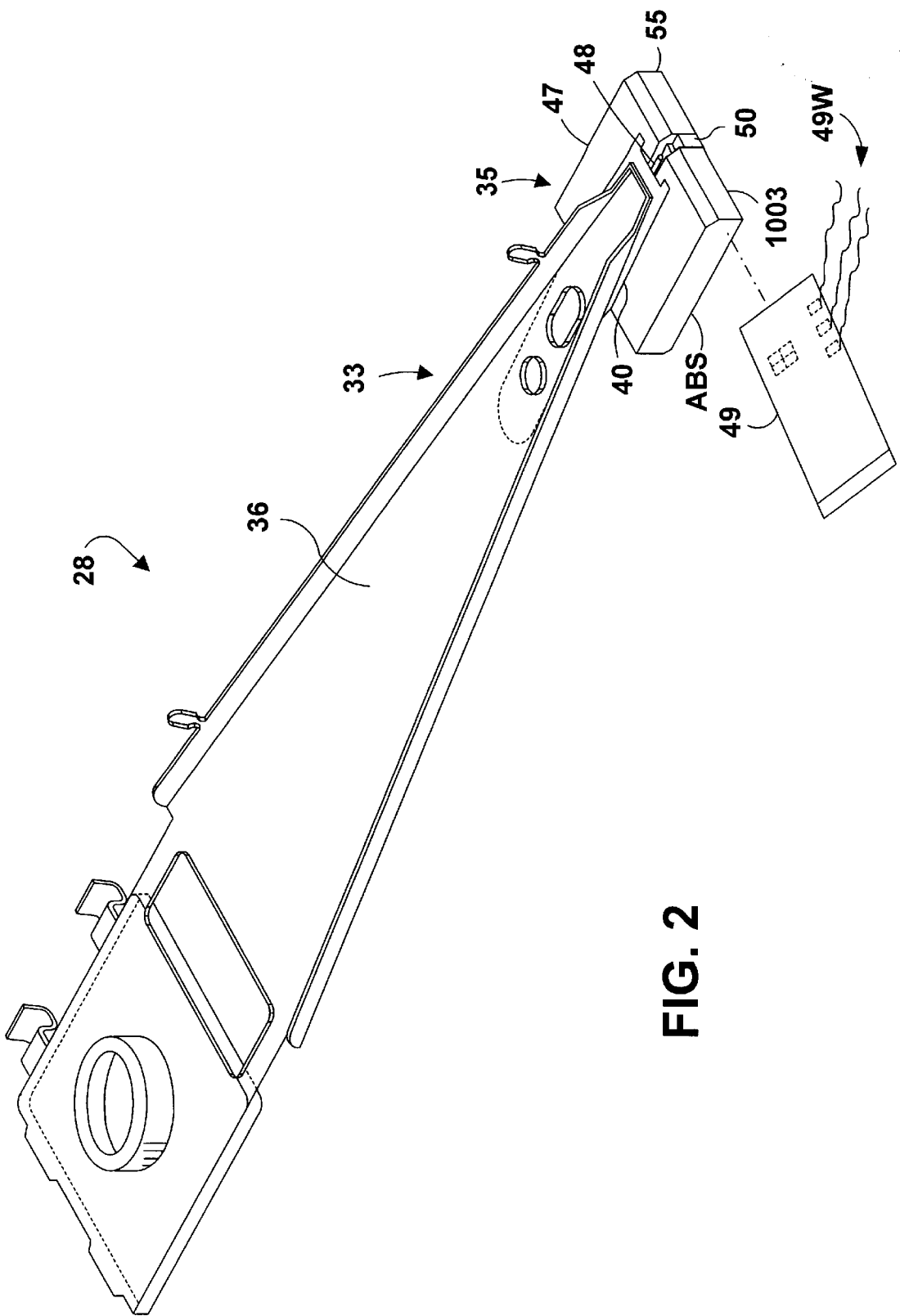
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

Figure 3:
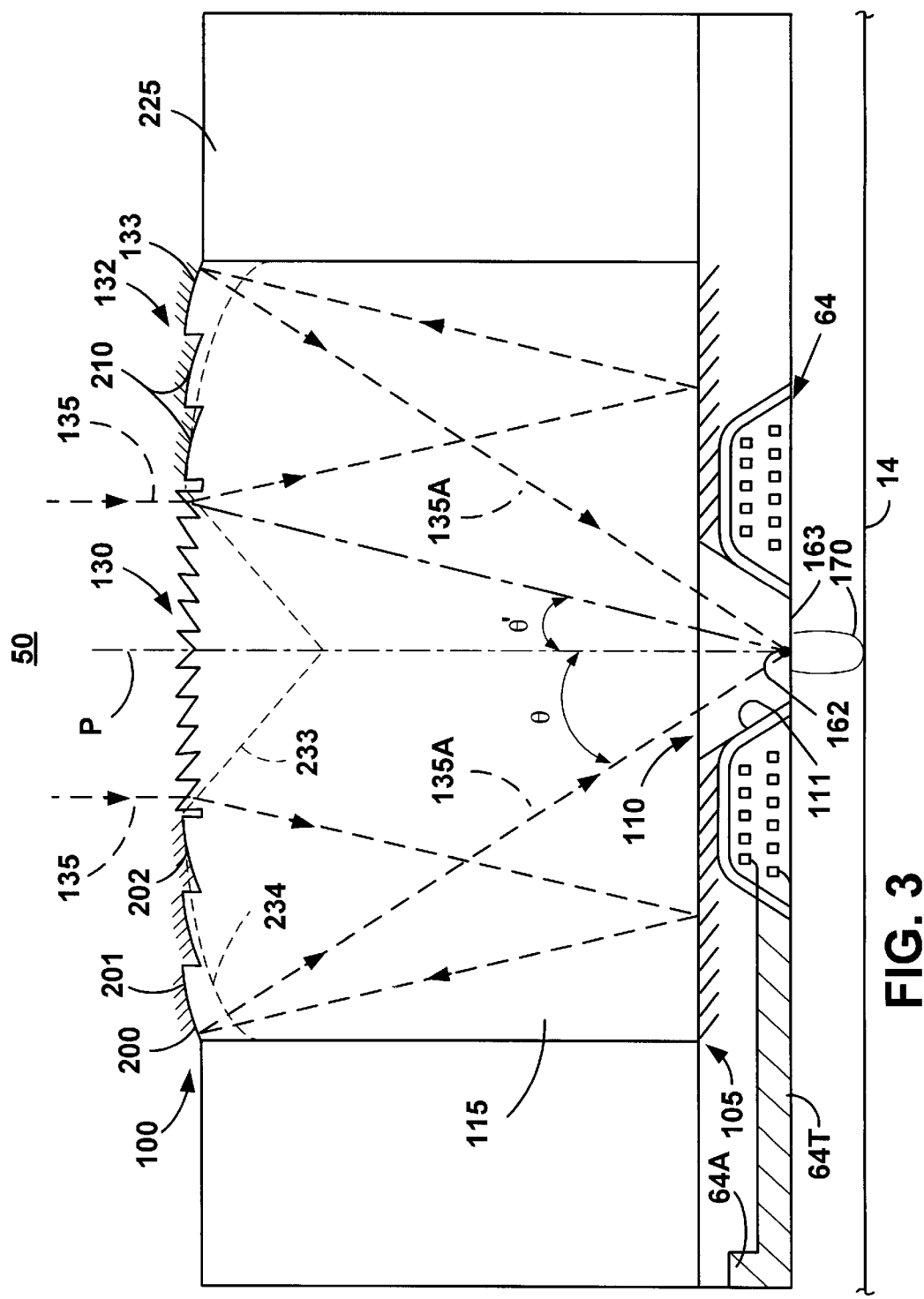
FIG. 3 is an enlarged, side elevational view of a catadioptric focusing device or lens forming part of the read/write head of FIGS. 1 and 2, and made according to the present invention.

The head 35 is formed of a slider (or slider body) 47 secured to the free end of the load beam 36 by means of the flexure 40, and a catadioptric focusing device or lens 50 retained by the slider 47. The head 35 further includes an optical beam delivery means, such as a waveguide or a fiber 48. A stationary or a micro-machined dynamic mirror 49 with wires 49W, can be secured to a trailing edge 55 of the slider 47 at a 45 degree angle relative to the optical beam emanating from the fiber 48, so as to reflect the optical beam onto the focusing device 50, in order to transduce data to and from a storage medium 14 (FIG. 3).

The slider 47 can be a conventional slider or any other suitable slider. In the present illustration, the slider 47 includes a fiber channel for receiving the optical fiber 48. Though the fiber channel is illustrated as being centrally located along a generally central axis of the slider 47, it should be understood that the location of the fiber channel can be offset relative to the central axis. In a design where the optical beam is delivered through free space, for example when a fiber is not used, the optical beam can be transmitted through the fiber channel or a waveguide formed within the fiber channel.

The details of the focusing device 50 will now be described with reference to FIGS. 3, 5 and 6. The focusing device 50 includes an incident surface 100, a bottom reflective surface 105, a focal pedestal 110, and a body 115. The incident surface 100 is generally flat and is comprised of a central diffractive, optically transmissive surface or central facet 130 and a peripheral reflector (or facet) 132 comprised of a diffractive or kinoform phase profile 133. The body 115 is optically transparent, and the incident surface 100 is formed on a first side of the body 115. The bottom reflective surface 105 is formed on a second side of the body 105, such that the first of second sides are preferably, but not necessarily, oppositely disposed. The pedestal 110 is formed on the same side as the reflective surface 105.

In a data writing mode, an incident optical beam, such as a laser beam 135 impinges upon the central facet 130, and is diffracted thereby. The incident laser beam 135 can be collimated, convergent or divergent. The laser beam 135 passes through the transparent body 115, and impinges upon the bottom reflective surface 105. The laser beam 135 is then reflected by the bottom reflective surface 105, through the body 115, onto the peripheral reflector 132. The laser beam 135 is refracted by the kinoform phase profile 133 as a focused beam 135A, through the body 115, and is further focused to a focal point 162 located within or on the surface of the pedestal 110 at, or in close proximity to an edge or surface of the pedestal 110 that defines a focal plane 163. In a preferred embodiment, the focal point 162 is located at the central axis P, in very close proximity to the disk 14, such that a localized evanescent field or light 170 interacts with disk 14, for enabling data to be transduced to and from the disk 14. A coil or coil assembly 64 is formed around the pedestal 110 and secured to the body 115, for generating a desired write magnetic field. Wire traces 64T (FIG. 3) connect the coil assembly 64 and contact pads 64A (FIGS. 3, 6).

The focused beam 135A defines an angle of incidence θ with the central plane P. It should be clear that the angle of incidence θ is greater than the angle of incidence θ' had the optical beam 135 not undergone the sequence of reflections and diffractions as explained herein. Consequently, the NA of the focusing device 50 exceeds that of a conventional objective lens, as supported by the following equation:

$$NA = n. \sin \theta,$$

where n is the index of refraction of the lens body 115. According to the present invention, it is now possible to select the lens body 115 of a material with a high index of refraction n, in order to increase NA.

The peripheral kinoform phase profile 133 is formed of a pattern of refractive profiles i.e., 200, 201, 202. While only three refractive profiles are illustrated, it should be understood that a greater number of refractive profiles can be selected. The pattern of refractive profiles 200, 201, 202 is coated with a reflective surface 210. In another embodiment, the peripheral kinoform phase profile 133 can be made of an appropriate diffractive grating or an appropriate lens structure such as a Fresnel lens.

The focal pedestal 110 can be formed integrally with lens body 115, and extends below the bottom reflective surface 105.

Figure 5:
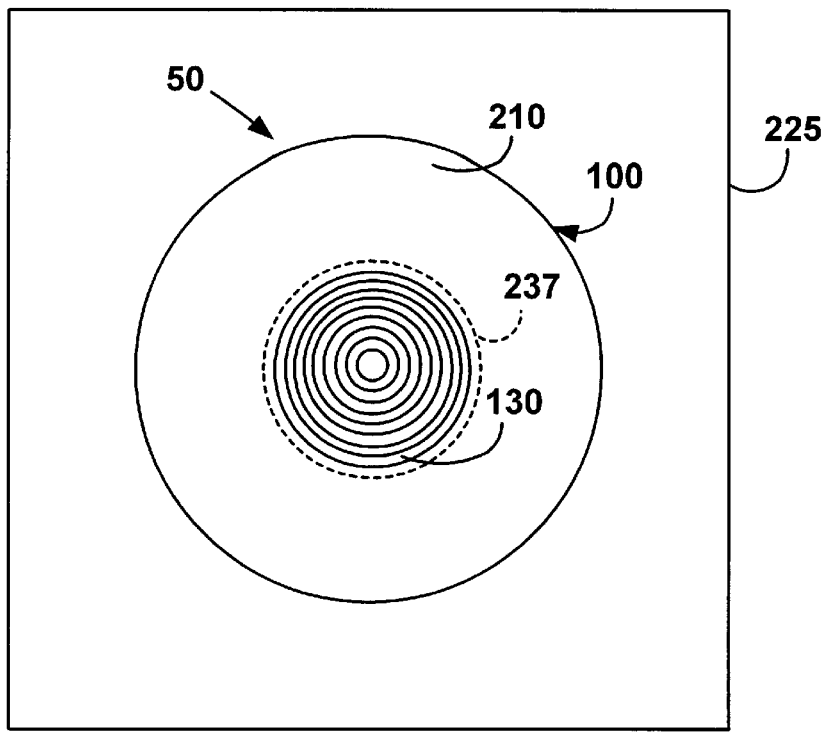
FIG. 5 is a top plan view of the catadioptric focusing devices of FIGS. 3 and 4.
Figure 6:
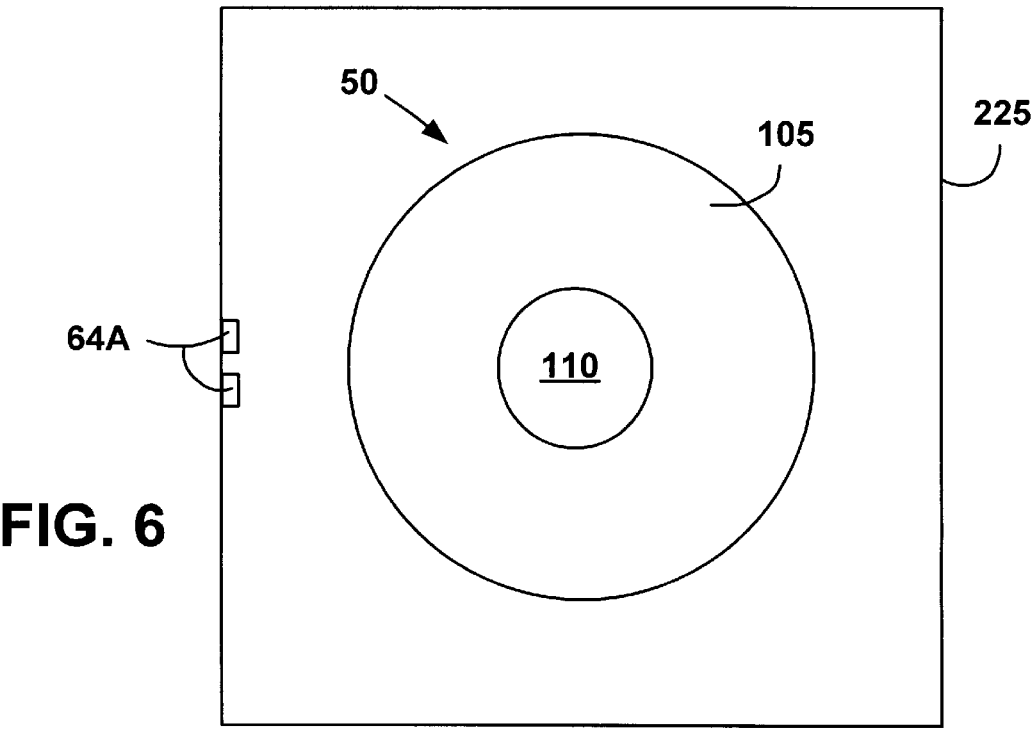
FIG. 6 is a bottom plan elevational view of the catadioptric focusing devices of FIGS. 3 and 4.

With particular reference to FIGS. 5 and 6, the focusing device 50 is generally cylindrically shaped with a circular cross-section, and is formed within a substrate 225. The transmissive surface 130 (FIG. 5) is concentric relative to, and is disposed within the reflective surface 210. The central facet 130 can simulate holographic or virtual flat, spherical, conical or other suitable diffractive surfaces 233 (shown in dashed lines in FIG. 3), while retaining its generally flat configuration. The reflective surface 210 is ring shaped. In an alternative design, the kinoform phase profile can simulate an aspherical refractive or diffractive surface 234 (shown in dashed lines in FIG. 3), while retaining its generally flat configuration.

Figure 4:
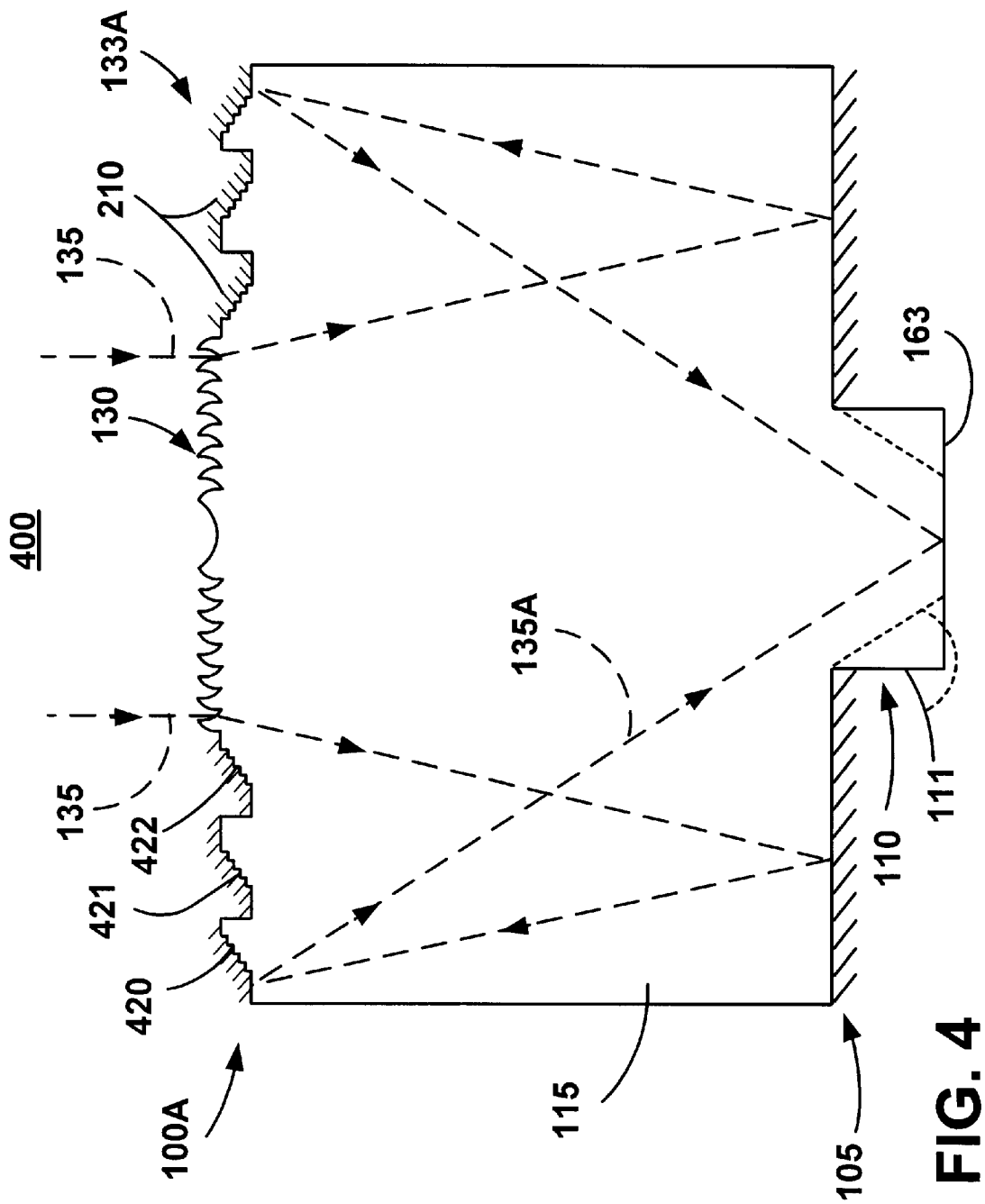
FIG. 4 is an enlarged, side elevational view of another catadioptric focusing device forming part of the read/write head of FIGS. 1 and 2, and made according to the present invention.

The pedestal 110 can be generally conically shaped (with an edge 111 shown in dashed line in FIG. 3), cylindrically shaped (as shown in FIG. 4), or it can have a trapezoidal (or another suitable) cross-section, and is co-axially and concentrically disposed relative to the bottom reflective surface 105. In an alternative embodiment, the central facet 130 includes an alignment ring 237 (shown in dashed lines in FIG. 5), that assists in the alignment of the optical focusing device 50 during assembly to the slider body 47.

As explained herein the optical focusing device 50 can be made using molding, etching, or other suitable manufacturing techniques. The flatness of the incident surface 100 helps facilitate wafer processing techniques to be used to mass assemble a lens wafer in which a plurality of optical focusing devices 50 are formed, to a slider wafer in which a plurality of sliders 47 are formed.

Using the present focusing device 50, it is possible to reduce the spot size on the disk 14 to less than 0.3 microns. The focusing device 50 can be made of any suitable transparent material, including but not limited to glass, crystal, plastic, or a combination thereof.

FIG. 4 illustrates another catadioptric focusing device 400 according to the present invention. The focusing device 400 is generally similar in function and design to the focusing device 50, and has its incident surface 100A comprised of a peripheral kinoform phase profile 133A. The peripheral kinoform phase profile 133A is formed of a reflective surface 210 that coats a pattern of concentric binary refractive profiles i.e., 420, 421, 422. The resolution of the refractive profiles 420, 421, 422 can vary, for example increased, in order to obtain a more precise control over the diffraction of the laser beam 135A.

Figure 7:
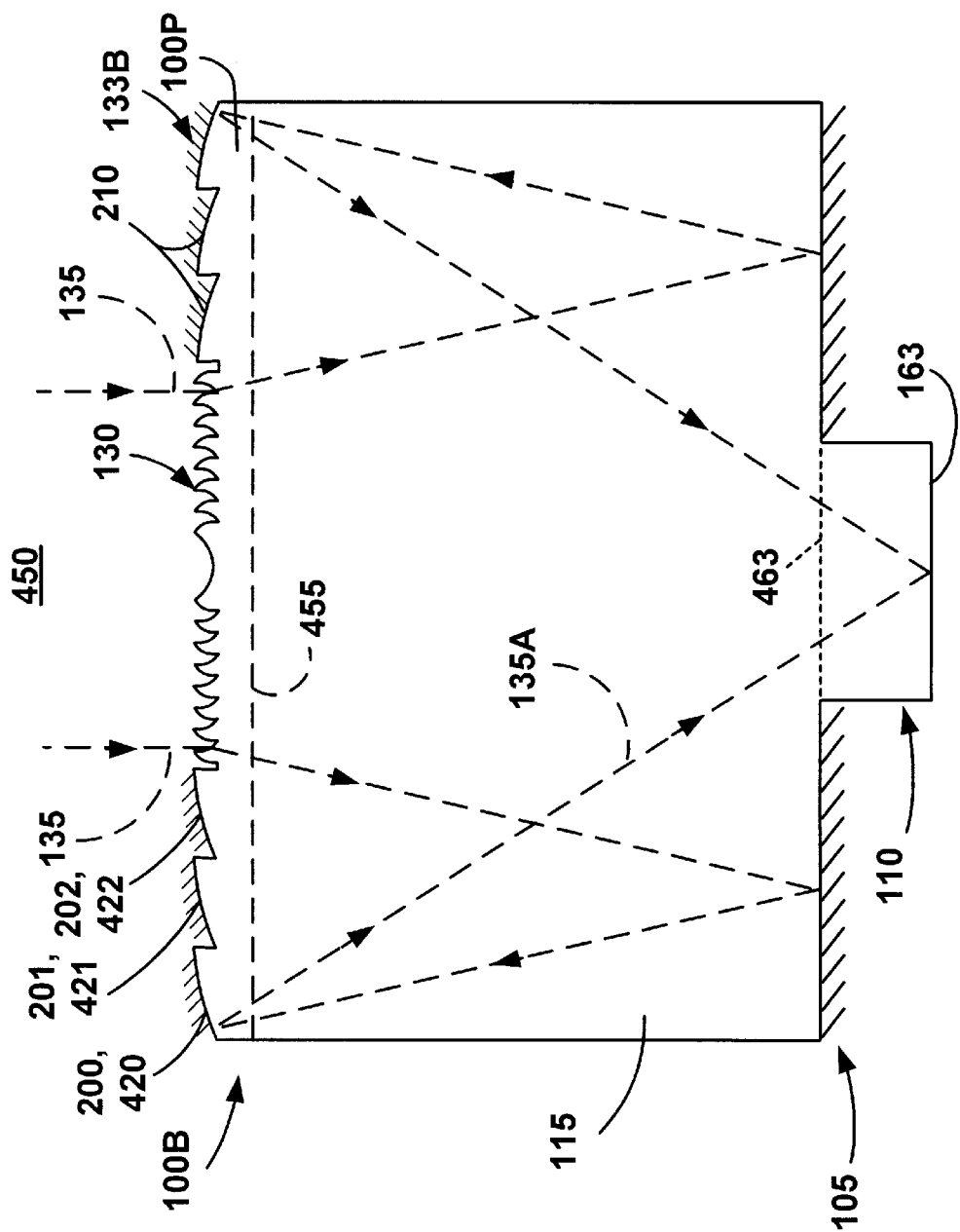
FIG. 7 is an enlarged, side elevational view of yet another catadioptric focusing device forming part of the read/write head of FIGS. 1 and 2, and made according to the present invention.

FIG. 7 illustrates another focusing device 450 according to the present invention. The focusing device 450 is generally similar in function and design to the focusing devices 50 and 400, and has its incident surface 100B comprised of a peripheral kinoform phase profile 133B. The peripheral kinoform phase profile 133B is formed of a reflective surface 210 that coats a pattern of concentric binary refractive profiles i.e., 200, 201, 202 or 420, 421, 422. Whereas in the focusing devices 50 and 400, the incident surfaces 100A, 100B are formed integrally with the lens body 115, the incident surface 100B can be formed of a separate plate 100P which is secured to the lens body 115 along a generally flat surface 455 (shown in a dashed line).

Another optional distinction between the focusing device 450 of FIG. 7 and the focusing devices 50 and 400 of FIGS. 3 and 4, respectively, is that the focal pedestal 110 can be made of a separate plate that is secured to the lens body 115 along a central, non-reflective surface 463 of the bottom of the lens body 115.

Though exemplary dimensions of the focusing device 50 and peripheral reflector 132 are shown for illustration purpose, it should be clear that other patterns can be selected. It should also be understood that the geometry, compositions, and dimensions of the elements described herein may be modified within the scope of the invention and are not intended to be the exclusive; rather, they can be modified within the scope of the invention. Other modifications can be made when implementing the invention for a particular environment. The use of the focusing device is not limited to data storage devices, as it can be used in various other optical applications, including but not limited to high resolution microscopy, surface inspection, and medical imaging.

What is claimed is:

1. A focusing device comprising:
    an optically transparent body;
    an incident surface formed on a first side of said body;
    a reflective surface formed on a second side of said body;
    a focal pedestal formed on said second side; and
    said incident surface being generally flat and comprised of a central diffractive, optically transmissive facet and a peripheral facet comprised of a kinoform phase profile.

2. A focusing device according to claim 1, wherein said first side and said second sides are oppositely disposed.

3. A focusing device according to claim 2, wherein when an incident optical beam impinges upon said central facet, the optical beam is diffracted by said central facet, passes through said body, impinges upon said reflective surface, is reflected by said reflective surface through said body onto said peripheral facet where it is refracted by said kinoform phase profile as a focused beam, through said body, onto a focal point located within or on a surface of said pedestal, such that a localized evanescent field is generated.

4. A focusing device according to claim 3, wherein said focal point is located along a central axis and forms an angle of incidence θ therewith.

5. A focusing device according to claim 4, wherein said incident optical beam is collimated.

6. A focusing device according to claim 4, wherein said incident optical beam is convergent.

7. A focusing device according to claim 4, wherein said incident optical beam is divergent.

8. A focusing device according to claim 4, wherein said incident optical beam is convergent.

9. A focusing device according to claim 3, having a numerical aperture NA defined by the following equation:

$$NA = n \cdot \sin \theta,$$

where n is the index of refraction of said body.

10. A focusing device according to claim 9, wherein said kinoform phase profile is formed of a pattern of refractive profiles.

11. A focusing device according to claim 9, wherein said pattern of refractive profiles is coated with a reflective surface.

12. A focusing device according to claim 3, wherein said pedestal is formed integrally with said body and extends below said reflective surface.

13. A focusing device according to claim 3, wherein said pedestal is separate from, and is secured to said body.

14. A focusing device according to claim 3, wherein said body is generally cylindrically shaped and substantially encapsulated within a protective substrate.

15. A focusing device according to claim 14, wherein said transmissive facet is concentric relative to, and is disposed within said peripheral facet.

16. A focusing device according to claim 3, wherein said central facet simulates any of a holographic surface, a spherical surface, or a conical diffractive surface while retaining its generally flat configuration.

17. A focusing device according to claim 3, wherein said reflective surface is generally ring shaped.

18. A focusing device according to claim 3, wherein said kinoform phase profile simulates an aspherical diffractive surface, while retaining its generally flat configuration.

19. A focusing device according to claim 3, wherein said pedestal is generally any of conically or cylindrically shaped.

20. A focusing device according to claim 3, wherein said incident surface is formed of a separate plate which is secured to said body along a generally flat surface.

21. A focusing device comprising:

an optically transparent body;

an incident surface formed on a first side of said body;

a reflective surface formed on a second side of said body;

a focal pedestal formed on said second side; and said incident surface being generally flat and comprised of a central diffractive, optically transmissive facet and a peripheral facet comprised of a diffractive-reflective profile.

22. A focusing device according to claim 21, wherein said first side and said second sides are oppositely disposed.

23. A focusing device according to claim 22, wherein a focal point of the focusing device is located along a central axis and forms an angle of incidence θ therewith.

24. A focusing device according to claim 23, having a numerical aperture NA defined by the following equation:

$$NA = n \cdot \sin\theta,$$

where n is the index of refraction of said body.

* * * * *